United States Patent [19]

Dornfeld et al.

[11] 4,188,651
[45] Feb. 12, 1980

[54] CERAMIC CAPACITOR WITH SURFACE ELECTRODES

[75] Inventors: John E. Dornfeld; Bobby L. Joyner, both of Mequon, Wis.

[73] Assignee: Sprague Electric Company, North Adams, Mass.

[21] Appl. No.: 890,343

[22] Filed: Mar. 27, 1978

[51] Int. Cl.² ............... H01G 1/005; H01G 4/08
[52] U.S. Cl. ................ 361/322; 361/303; 361/330
[58] Field of Search ......... 361/322, 321, 303, 304, 361/305, 281, 330

[56] References Cited

U.S. PATENT DOCUMENTS

| 1,578,977 | 3/1926 | Frasse | 361/303 X |
|---|---|---|---|
| 2,148,607 | 3/1939 | DeLange | 361/321 |
| 2,841,508 | 7/1958 | Roup | 361/322 X |
| 3,133,338 | 5/1964 | Fabricius | 29/25.42 |
| 3,221,228 | 11/1965 | Carter | 361/305 |
| 3,274,468 | 9/1966 | Rodriguez | 361/321 |
| 3,465,267 | 9/1969 | Carlson | 361/303 |
| 3,828,454 | 3/1974 | Khouri | 361/321 |

FOREIGN PATENT DOCUMENTS

| 572089 | 2/1933 | Fed. Rep. of Germany | 361/303 |
|---|---|---|---|
| 2516201 | 10/1976 | Fed. Rep. of Germany | 361/304 |
| 1469944 | 4/1977 | United Kingdom | 361/303 |

OTHER PUBLICATIONS

Alley "Interdigital Capacitors & Their Application to Lumped-Element Microwave Integrater Circuits," in IEE Transactions on Microwave Theory & Techniques, vol. #12, 12/70, pp. 1028-1033.

*Primary Examiner*—Elliot A. Goldberg
*Attorney, Agent, or Firm*—Connolly and Hutz

[57] ABSTRACT

A reduced barium titanate ceramic capacitor in the form of a rod has closely-spaced electrodes connected in parallel or two spiraled electrodes on the surface thereof and a dielectric layer underneath each. By reducing both the distance between adjacent electrodes and the width of the electrodes, a capacitor with a low power factor is obtained.

7 Claims, 2 Drawing Figures

CERAMIC CAPACITOR WITH SURFACE ELECTRODES

BACKGROUND OF THE INVENTION

This invention relates to a ceramic capacitor having a low power factor. More specifically, it relates to a cylindrical barium titanate capacitor having closely spaced, substantially parallel electrodes, connected in parallel, or two electrodes spiraled on its surface with a thin dielectric layer underneath each electrode.

It is known to form a capacitor by firing a barium titanate ceramic in air to mature it, thus forming an insulator or dielectric throughout its surface, and then firing in a reducing atmosphere to form a semi-conductor throughout. The electrodes are applied and fired-on; this step also produces a thin insulating or dielectric layer underneath the electrodes.

Alternatively, the ceramic may be sintered, reduced and reoxidized along the margins before the electrodes are applied. The semiconducting part of the ceramic may also be formed by suitable doping a green ceramic mix and firing in air to form both the semiconducting and dielectric zones without a reducing step. Another method involves preparing both the ceramic and the electronic mixes, assemblying, firing in air to remove organic matter, e.g. binders, and then in a reducing atmosphere with no subsequent reoxidation. In the latter case, metal electrodes melting above 1150° C. are used. Commonly, these electrodes are of platinum or palladium to be able to withstand the firing temperatures and also not oxidize, although iron compositions have also been used. When the electrodes are made of gold or platinum, there is no oxidation of the ceramic material underneath; rather there is an ohmic connection.

It is also well known that electrodes of the same area have the same capacitance whether they are on the same or opposite sides of the semi-conductor. However, when the electrodes are coplanar, the resistance of the conducting path which connects two dielectric layers through the semiconductor increases because of the increased length of the path between them. Power factor is also increased with increasing path length.

SUMMARY OF THE INVENTION

It is an object of the invention to provide a cylindrical ceramic capacitor of the reduced barium titanate type with electrodes on a surface thereof.

It is another object of the invention to provide a reduced barium titanate type capacitor with low power factor.

It is still another object of the invention to provide a reduced titanate capacitor having coplanar electrodes and a low power factor.

It is yet another object of this invention to provide a ceramic capacitor which is easily handled by automatic equipment and compatible with other cylindrical devices thus reducing production costs for both the manufacturer and user.

These object are obtained by decreasing the width of and the distance between coplanar electrodes on the surface of a reduced barium titanate body and hence, decreasing resistance. Briefly, the ceramic mix is prepared, extruded, e.g., as a rod, and fired. The resulting hardened body is then reduced, preferably in hydrogen, to form a semiconductor. The electrodes are painted on and fired, causing the electrodes to bond to the substrate and to form a thin film of dielectric beneath them. Alternate electrodes are connected by end caps which serve as terminals, and lead wires are welded to the end caps. Alternately, end caps with leads already attached may be used, such as shown in, for example Claypoole et al, U.S. Pat. No. 3,515,958, issued June 2, 1970. The units may then be cover-coated, tested, and marked.

The electrodes may be applied parallel to the axis of the rod or two electrodes spiralled around it. By applying either a plurality of closely-spaced, alternating, interdigitating electrodes on a single face, or two closely spiralled electrodes, capacitance is reduced somewhat but power factor is greatly reduced.

Since the electrodes are on the surface of the capacitor, silver rather than the more expensive platinum or palladium electrodes can be used. Also, the electrodes may be easily painted on automatically to provide a multi-electrode unit without stacking or interleaving alignment problems.

BRIEF DESCRIPTION OF THE DRAWINGS

Referring now to the drawings,

In FIG. 1, a plurality of closely-spaced electrodes 12 and 14 are placed on the surface of a reduced barium titanate ceramic rod 10 with alternate electrodes 12 extending from one end of the rod parallel to its long axis but terminating short of the opposite end. Another set of electrodes 14 extend from this opposite end interdigitating between the first set and terminating short of the end of the rod. There is a thin dielectric layer 16 beneath each electrode. End caps (not shown) are attached to the ends of the rod as terminals connecting the electrodes in parallel.

In FIG. 2, two electrodes 22 and 24 are shown spiralled around the reduced barium titanate ceramic rod 20. One electrode 22 extends from one end of the rod around it and terminates short of the other end while the second electrode 24 extends from this end around the rod and terminates short of the first end. There is a thin layer of dielectric material 26 underneath each electrode. End caps (not shown) are attached to each end of rod as terminals for the respective electrodes. The spirals are shown farther apart for the sake of clarity than they are in actual practice. In actual practice, they should be tightly wound, narrow electrodes with a minimum gap therebetween.

DESCRIPTION OF THE PREFERRED EMBODIMENTS

Figure 1:
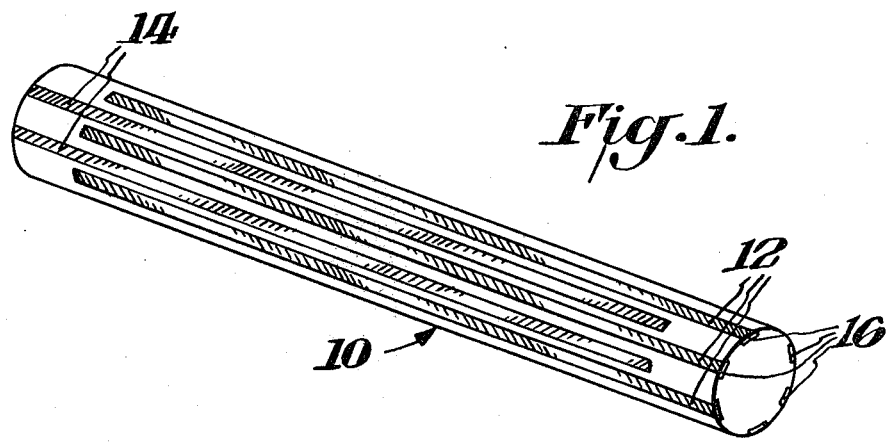
FIG. 1 is a pictorial view showing a rod with a plurality of closely-spaced electrodes on its surface.
Figure 2:
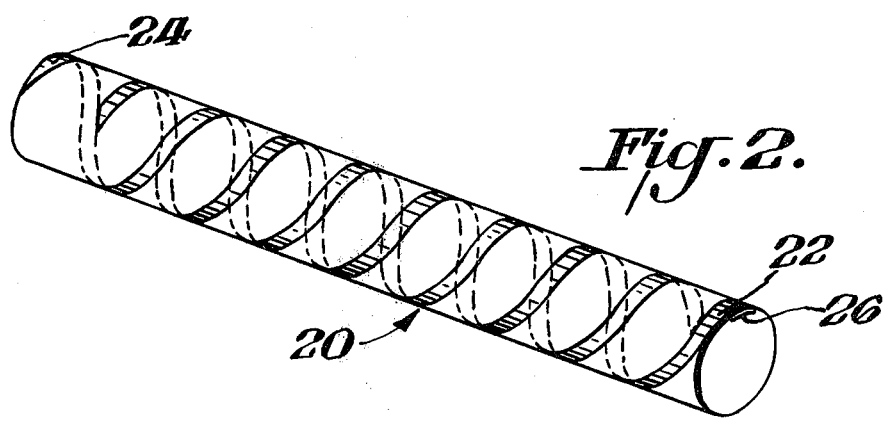
FIG. 2 is an expanded view showing a rod with two electrodes closely spiralled around it.

In order to reduce the power factor of a reduced barium titanate ceramic capacitor, the path length between electrodes through the semiconductor is reduced by making the capacitor in the form of a ceramic rod and applying the electrodes to its surface. By closely spacing the electrodes on the surface so there is only a small separator gap between adjacent electrodes, this resistance path can be reduced. It can be further reduced by controlling the width of the electrodes, i.e., making them narrow.

In one embodiment, two electrodes are closely spaced in a tight spiral around the rod, one electrode starting at one end of the rod and terminating short of the other end and the second electrode, vice versa. End caps to which leads have been or are attached serve as terminals, one for each electrode.

In another embodiment, a plurality of thin electroees are applied to the surface of the rod closely spaced parallel with the long axis of the rod. Alternate electrodes start at one end of the rod and terminate short of the other end while the remaining electrodes start at the second end and terminate short of the first. When end cap terminals are applied, with or without attached lead wires, they connect alternate electrodes in parallel.

EXAMPLE 1

In the following example, the effect of increasing the number of electrodes applied longitudinally along a rod is shown. A barium titanate ceramic material was extruded as a 3/16" rod, fired at 1360° C. for 2 hrs, and cut into approximately ⅜" lengths. The rods were reduced in a nitrogen-hydrogen mixture at 930° C. for 1 hr, and, when cool, silver electrode material was painted on. Such a material is DuPont 9312 obtained from E. I. duPont de Nemours Co., Inc., Wilmington, Delaware. Insulating gaps were ground lengthwise between electrodes, parallel to the axis of the rod, and the units were fired in air at 940° C. to bond the electrodes to the surface. Alternate electrodes were joined electrically so that a single capacitance was obtained.

| Number of Electrodes | Capacitance, μF | Power Factor, % |
|---|---|---|
| 2 | 0.14 | 37 |
| 4 | 0.15 | 9 |
| 8 | 0.1 | 7.7 |
| 16 | 0.07 | 3 |

Thus, while capacitance is reduced somewhat, power factor is dramatically reduced.

What is claimed is:

1. A capacitor comprising a semiconductive cylindrical body of reduced ceramic material, a plurality of closely-spaced, substantially parallel, interdigitated metal electrodes disposed on the cylindrical surface of said body, said body having a thin dielectric layer of an oxidized state of said ceramic material immediately beneath each of said electrodes, and a terminal disposed over each end of said cylindrical body, each said terminal in contact with at least one alternate of said interdigitated electrodes.

2. A capacitor according to claim 1 wherein said electrodes extend lengthwise substantially along the length of said cylindrical body.

3. A capacitor according to claim 1 wherein there are two electrodes and said electrodes spiral around said cylindrical body.

4. A capacitor according to claim 1 wherein said cylindrical body is a rod.

5. A capacitor according to claim 1 wherein said body comprises reduced barium titanate, and said dielectric layer comprises oxidized barium titanate.

6. A capacitor according to claim 2 wherein said closely spaced electrodes are thin electrodes, alternate of said thin electrodes extend from one end of said body to short of the other end, and the others of said thin electrodes extend from said other end to short of said one end.

7. A capacitor according to claim 6 wherein each said terminal is an end cap, said alternate electrodes are connected in parallel by one said end cap, and said other electrodes are connected in parallel by another said end cap.

* * * * *